May 6, 1969 L. A. STENSAKER ET AL 3,442,732
FRICTION-FUSION STRAP SEALING
Filed Aug. 13, 1965

INVENTORS
Lee A. Stensaker
Seymour E. Heymann
Hobart P. Young
Ilmar J. Vilcins
BY Dressler, Goldsmith,
Clement, Gordon & Ladd
ATTORNEYS

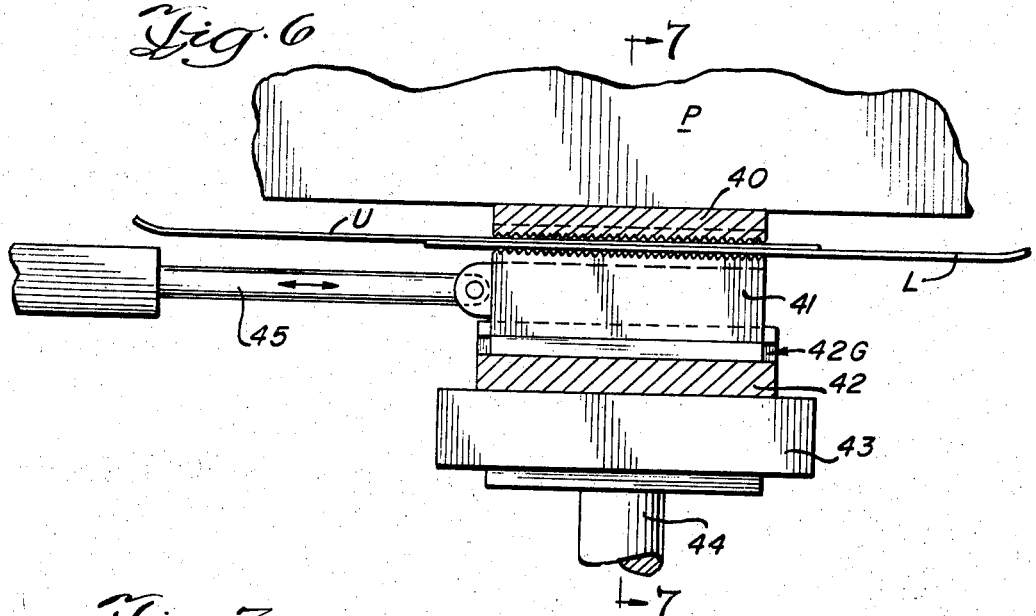
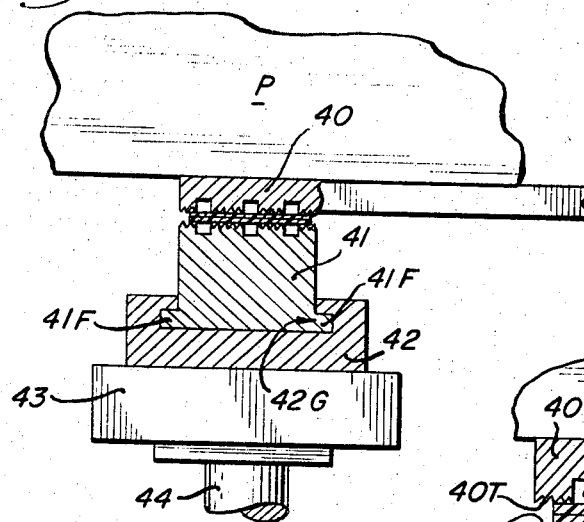
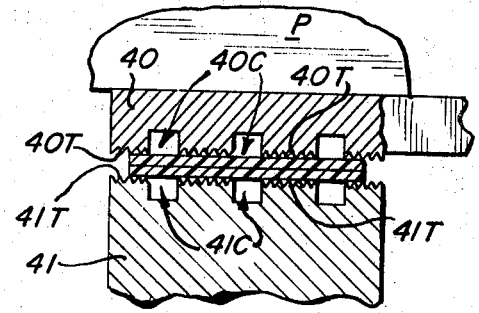

May 6, 1969
L. A. STENSAKER ET AL
3,442,732
FRICTION-FUSION STRAP SEALING
Filed Aug. 13, 1965
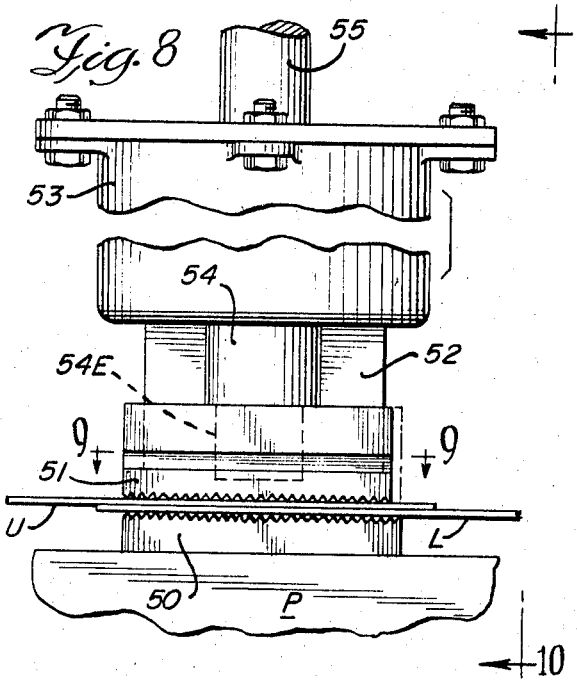
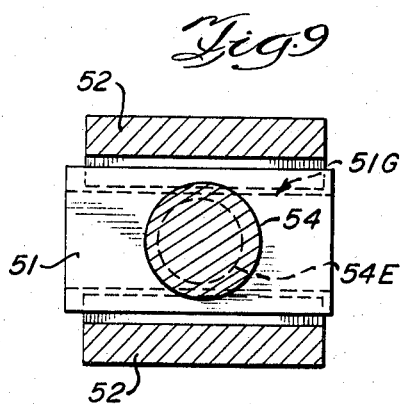
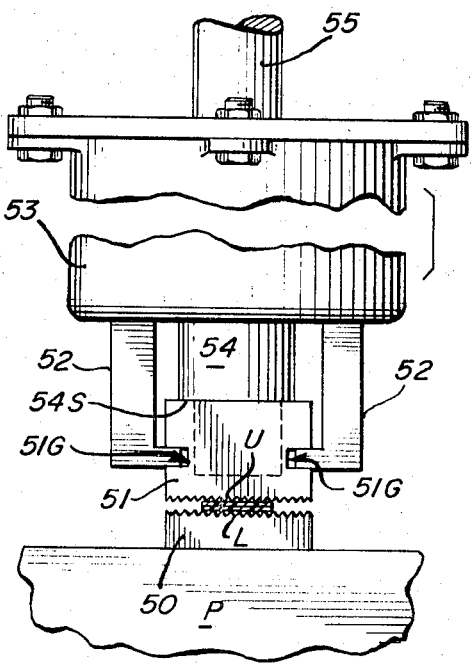
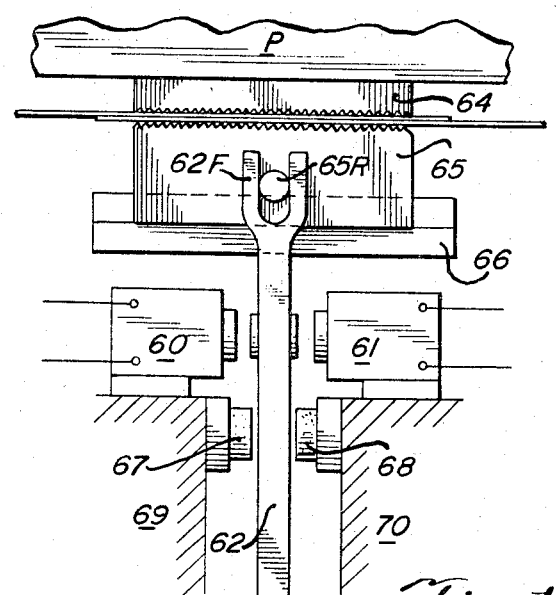
INVENTORS
Lee A. Stensaker
Seymour E. Heymann
Hobart P. Young
Ilmar J. Vilcins
By Dressler, Goldsmith,
Clement, Gordon & Todd
ATTORNEYS

United States Patent Office 3,442,732
Patented May 6, 1969

3,442,732
FRICTION-FUSION STRAP SEALING
Lee A. Stensaker, Streamwood, and Seymour E. Heymann and Hobart P. Young, Winnetka, and Ilmar J. Vilcins, Northbrook, Ill., assignors to Signode Corporation, a corporation of Delaware
Filed Aug. 13, 1965, Ser. No. 479,446
Int. Cl. B65b 13/32; B32b 31/20
U.S. Cl. 156—73        28 Claims

ABSTRACT OF THE DISCLOSURE

A method for providing a ligature about an article into a tensioned loop having overlapping end portions. The end portions of the ligature are first compressed and then moved multidirectionally relative to one another to effect interface melting between the overlapping end portions. The joint is finally formed by maintaining the interface regions in fusing contact until solidification is effected. Apparatus for producing the friction-fused joint by multidirectional movement is also disclosed.

---

This invention relates to apparatus and methods for fusing together overlapping end portions of a strap loop of plastic or similar material. As used herein, plastic refers to heat fusible materials, natural or synthetic, which are relatively soft compared to steel and which may be formed into an elongated configuration having necessary elastic and resilient properties enabling the same to conform to the shape of an object which it encircles. In particular, plastic strap formulated from thermoplastic resin material such as a longitudinally oriented linear polymer is in current use and represents an important application for the present invention. Polypropylene strapping is one such material to which the invention has been applied and "nylon" is another.

There are a number of existing strapping applications where plastic strap is more suitable than steel strap. For example, plastic strap being elastic is more stretchable than is steel strap and finds important application in connection with tying packages which are subject to expansion or contraction, or which are subject to conditions which would impose a substantial shock load upon the loop of strap.

Another advantage in the use of plastic strap arises in situations where the problem of waste disposal is significant.

Until now, one of the drawbacks in the use of plastic strap arises from the difficulties occurring in connection with tying the opposite ends of a loop of plastic strap. Steel strap has conventionally been tied in a loop configuration by means of metal seals which are mechanically folded and crimped about the overlapping ends. This technique depends upon properties of steel strap which are not present in plastic strap and the technique therefore has limited application to plastic strap. A variety of special fasteners are currently used for tying opposite ends of a plastic strap, but in many instances, the presence of any metal parts is itself objectionable and, in addition, the effectiveness of such fasteners and the convenience of applying the same to plastic strap raises practical problems.

Accordingly, there has existed until the time of the present invention an important need for a joint connection arrangement suitable for securing overlapping ends of plastic strapping without requiring separate mechanical fasteners. The present invention provides a solution to this problem by utilizing controlled frictional movement between the overlapping ends of the strapping to generate heat of fusion between the contacting surfaces of the strap ends in a fashion to effect direct bonding of these surfaces.

It is to be noted that in the strapping field the fusion of ends of strapping involves a number of critical problems. These problems include the fact that plastic strapping material is selected for its tensile strength and as such is usually of a longitudinally oriented polymer material arranged in a strap of thin section, for example, 0.015 inch thickness. The fusion joint, therefore, must be effected without disrupting the orientation properties of the strap material adjacent to the actual joint interface region. In the usual application, the strap ends which are to be joined are opposite extremities of a loop which has been tightly drawn about an object by manual or power tool equipment. The formation and completion of the joint must be effected without disturbing the essential tautness of the loop. In addition, the joint strength must approach the strength of the strap itself.

The present invention provides methods and apparatus wherein strap ends are arranged in overlapping relation and concurrently subjected to substantial pressure and rapid but low amplitude movement to develop heat by sliding frictional contact at a rate to provide melting of the contacting surfaces without affecting the orientation properties of the strap material adjacent to these surfaces. The pressure is maintained between the strap ends to grip the same until fusion is substantially completed, and immediately thereafter the tension of the strap loop acts directly through the joint region.

Other and further features of the invention will be apparent from the following description and claims, and are illustrated in the accompanying drawings which show an illustrative embodiment of the present invention.

In the accompanying drawings forming part of the specification, and in which like numerals are employed to designate like parts throughout the same, FIGURE 1 is a diagrammatic view illustrating a strap loop encircling an object to be tied and having overlapping ends of the strap loop across the top of the object and threaded through tensioning mechanism and an adjacent friction sealer mechanism each shown in block diagram form;

FIG. 6 is an elevational view of another form of friction sealer mechanism illustrated in a bottom tie arrangement for providing frictional sliding movement between overlapping strap ends underlying an object to be tied;

FIG. 7 is a cross-sectional view taken as indicated on the line 7—7 of FIG. 6;

FIG. 7a is an enlarged fragmentary section more completely illustrating the jaw and gripping face arrangement of FIG. 7;

FIG. 8 is a front elevational view of another form of friction sealer mechanism usable in a top tie arrangement producing frictional sliding movement;

FIG. 9 is a detailed sectional view taken as indicated on the line 9—9 of FIG. 8;

FIG. 10 is a side elevational view taken as indicated on the line 10—10 of FIG. 8; and FIG. 11 is an elevational view of a solenoid driven friction sealer mechanism applied to a bottom tie arrangement.

Figure 1:
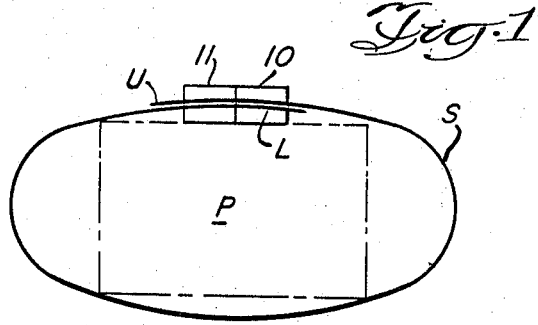

Referring now to the drawings, a strapping arrangement is illustrated in FIG. 1, wherein a ligature in the form of a strap loop S is shown encircling an object or package P which is to be tied. The strap portions U and L at the opposite ends of the loop are in overlapping contacting relation to each other across the top of the object. In the particular top tie loop configuration illustrated, the lower overlapping strap portion L is the free end and the upper overlapping strap portion U leads from a payout reel (not shown). When warranted, the strap may be handled in precut lengths. The strapping arrangement is represented in block diagram as including mechanism 10 for drawing tension on the loop and friction sealer mechanism 11 for producing a fusion bond between the contacting surfaces of the overlapping strap ends U and L.

The tensioning mechanism 10 may be manual, semi-automatic or fully automatic and while illustrated in this disclosure as being associated with a strap region which is a part of the loop, it may also be associated with a strap region which is external of the loop.

In the present arrangement, the tensioning mechanism 10 is of a type that holds the strap ends stationary during the action of the friciton sealer mechanism 11. A typical structure of this type is shown in the U.S. Patent No. 2,621,893 issued to Childress on Dec. 16, 1952.

Frequently it is convenient to integrate the mechanisms 10 and 11, but they may also be separate and utilized in side by side relation.

The present invention is concerned with the fusion technique as applied to the strapping field and while this involves general relationships to the tensioning mechanism, it is also adaptable to various embodiments, locations and mounting relationships for the tensioning mechanism.

Figure 2:
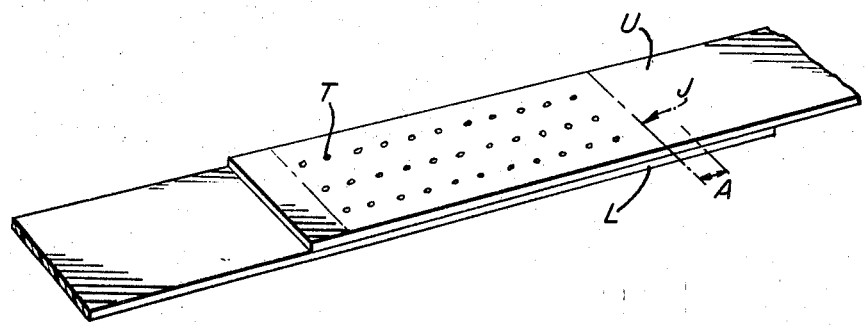
FIG. 2 is a perspective view of a fused joint formed by frictional sliding movement between the strap ends.

The overlapping strap ends U and L of FIG. 1 are shown in enlarged form in FIG. 2 to illustrate the finished joint. The actual area of the joint is shown by the phantom outline J, and in an illustrative embodiment for overlapping ends of 0.015 inch thick polypropylene strap, the joint has a length of 1¾ inches where the fused area spans the full width of the strap. As is shown in FIGS. 6 and 7, however, the gripper faces, and hence the joint, need not be continuous across the entire width of the strap but may have a channeled pattern consisting of laterally spaced lengthwise strips.

The fusion joint is shown to be between the major surface area regions of the strap ends which are brought into overlapping contacting relationship preparatory to forming the joint. For the joint illustrated in FIG. 2, teeth marks T are represented on the exposed face of the upper end U. The elements that grip the exposed faces have teeth to establish a firm bite on the strap while still effecting adequate distribution of pressure over the joint area. The fused region is localized to the actual interface surface area to avoid impairment of the orientation properties of the deeper or interior strap regions, but this fused region is distributed uniformly throughout the joint area. Fusion joints of this type are reliably formed by the practice of the present invention to achieve a strength of 60 to 90% of the strap tensile strength.

In accordance with this invention, the fusion joint is accomplished by forcing the major surface area interface regions into distributed contact under substantial pressures and concurrently effecting relative frictional sliding movement between the interface regions to develop an abrupt rise to melting temperature at the interface. Pressure is maintained at the interface during a cooling interval when actual solidification of the melted surfaces occurs.

Pressure and motion conditions to produce an abrupt temperature rise at the strap interface surfaces are employed to aid in restricting the depth of the fusion area, thus avoiding impairment of orientation properties of adjacent internal regions of strap. Such pressure and motion conditions have proven effective because the coefficient of friction between the sliding strap faces declines when substantial melting occurs throughout the interface regions.

For polypropylene strap, pressure and motion conditions are specified which enable a fusion effect to be developed after a total sliding friction travel of the strap faces of about 10 inches. The pressure and motion conditions may be continued beyond this amount of total travel, with effective solidification still resulting, by holding the strap during a cooling interval following termination of the motion.

For nylon strap, which is characterized by a sharply defined melting point, a total sliding friction travel of about 3 to 4 inches is accurately timed and terminated, with effective solidification occurring while holding the strap during a cooling interval following termination of the motion. With nylon, continued sliding friction travel beyond the indicated range of 3 to 4 inches can create effects that impair the final solidification at the joint unless the joint is subjected to tension while it is still hot.

By way of example, nylon strap, which melts at about 475° F., can be brought to fusion by a sliding friction travel totalling 3 inches, or preferably substantially more, then held stationary to allow solidification to progress throughout the joint interface, and then while still hot, the joint is subjected to tension. The ultimate joint strength, both while warm, or hot, and later when fully cooled, is substantially greater because of tensioning the joint while warm or hot. Figures are given below relating joint strengths to ultimate strap strength for nylon strap of 0.030 inch by ½ inch.

In terms of temperature, when the joint is subjected to tension while at a temperature of 400° F., a joint strength of 600 lbs. results, whereas if tension were not applied until the joint reached ambient temperature, a joint strength of 300 lbs. results. It will be recalled that high strength joints can still be provided by carefully limiting the total travel as previously indicated.

In terms of actual cooling intervals, joint strengths of approximately 600 lbs. result when tension is applied within 15 seconds of sealing; joint strengths of approximately 450 lbs. result when tension is applied about 1 minute after sealing, and joint strengths of approximately 320 lbs. result when tension is applied about 2 minutes, or more, after sealing.

One truly practical effect concerned with tensioning of warm joints between ends of nylon strap is that the greater the tension applied to the warm joint, the greater the ultimate joint strength. In addition, the joint strength exceeds the tension so that, when dealing with tensioned loops, the joint strength can be greatly enhanced by subjecting the warm joint to the tension acting in the loop. The ultimate joint strength, thus resulting, is greater than the actual tension in the loop so the finished loop will remain sound unless abnormal stresses are encountered during subsequent handling.

The transmission of load through the joint is significantly improved, presumably because the warm or hot state of the strap portions at the joint area at the time the joint is tensioned makes these strap portions more ductile and allows them to undergo plastic deformation so that the joint may elongate without cracking. When the joint ultimately cools and freezes, the strap portions at the joint lose ductility and the joint is in effect prestressed. When the load on the joint is ultimately removed, as by cutting the strap loop, the joint assumes a wavy configuration evidencing this prestressed effect.

To achieve maximum strength, the fusion bond between the interface regions spans the entire length of the interface surface area. While the joint may be shorter where the full strap width is utilized, the channeled joint pattern configuration has the advantage of isolating any failure areas that develop. The uniformity in the distribution of the fusion bond is achieved by concentrating the sliding friction movement path and by causing each point of each interface surface to experience a comparable total travel. A preferred arrangement for accomplishing the desired distribution of the bond region employs a low amplitude oscillation along a path oriented in the longitudinal direction of the strap. By way of example, in FIG. 2, for a joint length of 1¾ inches, the amplitude of sliding movement, as represented at A, is approximately ⅛ inch. Thus, the initial interface surfaces are maintained in substantial registry during the friction movement action and thermal input is concentrated over the initial interface area, with the size of unbonded fringe areas at opposite lengthwise ends of the joint being minimized.

Typical operating ranges that have been successfully employed with 0.015 to 0.065 inch thick oriented polypropylene strap formed with joints of 1¾ inch length to assure a joint strength of at least 80% of the strap strength are now given. Corresponding values are also given for nylon.

|  | Polypropylene | Nylon |
|---|---|---|
| Gripper face length | 1¾ inches | Same. |
| Contact pressure range | 100 to 3,000 p.s.i. | Do. |
| Frequency of oscillation | 700 to 6,000 cycles/min | Do. |
| Amplitude of oscillation (peak to peak). | 0.050 to 0.500 inch | Do. |
| Time of oscillation | 0.2 second or more | Do. |
| Cooling interval | 0.10 second or more | 0.10 second. |
| Total friction travel | 10 inches or more | 3 to 4 inches. |

In these ranges of operation, the pressure values are not closely critical. One of the primary requirements with respect to pressure is the need to establish an effective frictional contact between the contacting surfaces of the strap. In general, it has been shown that the higher the frequency values and amplitudes, the shorter the thermal input pulse interval. There is advantage in operating at higher frequencies as the ampltiude of oscillation may correspondingly be reduced.

Figure 3:
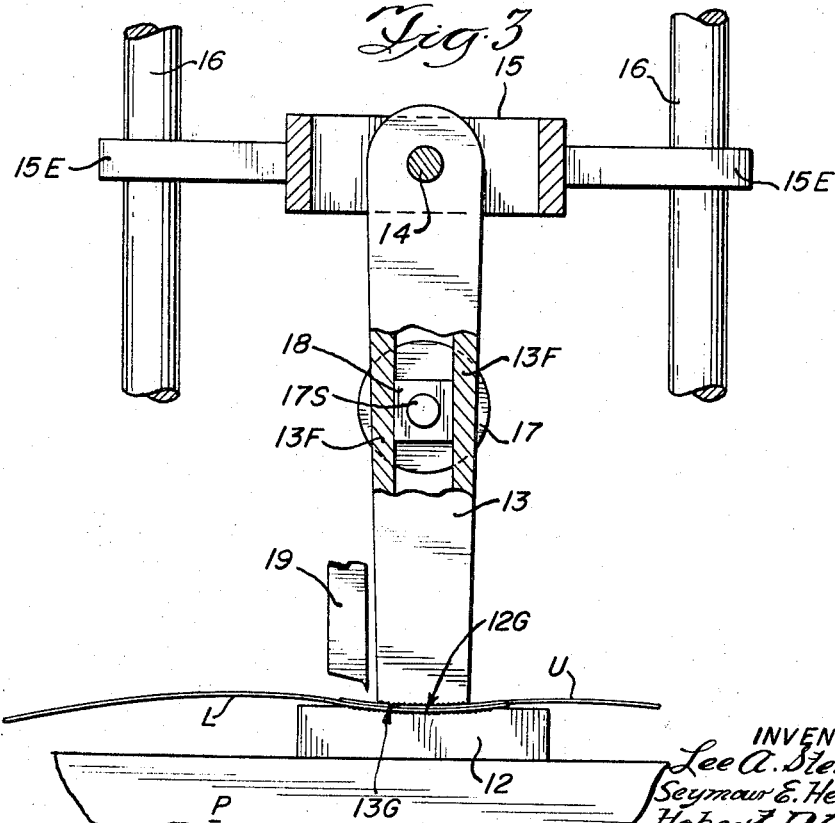
FIG. 3 is a front view of one form of friction sealer mechanism for producing sliding frictional movement between the strap ends to effect a fusion bond.

Referring now to FIG. 3 of the drawings, one practical form of friction sealer mechanism is illustrated as including a main frame portion 12 to engage the top of the object P being tied and present an upwardly directed gripper face 12G for stationary contact with the lower strap end L. A movable gripper face 13G is provided on the end of a vertical swing arm 13 which is mounted at the top to a pivot shaft 14 carried in a transverse mounting frame 15. The mounting frame 15 has opposite ends 15E fixed to a pair of lifter rods 16 that are shiftable vertically to bring the gripper faces 12G and 13G into strap compressing engagement at the prescribed pressures. The actual lifting mechanism associated with the lifter rods 16 is not shown but may be of any pneumatic or simliar type capable of effecting and maintaining the prescribed uniform pressure between the gripper faces. The movable gripper face 13G is arcuate and curves about the shaft 14 as a center of rotation. Likewise, the stationary gripper face 12G is arcuate and curved about the shaft 14 as a center.

In the form of FIG. 3, the fusion joint is formed between parallel arcuate strap portions and the longitudinal oscillating travel is along an arcuate path. Oscillating movement is imparted to the swing arm 13 by means of a pneumatic, hydraulic or electric motor 17 which is associated with an intermediate region of the swing arm. The intermediate region of the swing arm has parallel vertical edge flanges 13F to present a channel-like cross section for defining a radial guideway in which a rectangular oilite bearing block 18 is slidable. An eccentric stub end of a motor shaft 17S is journaled in this bearing block 18. The stub end of the motor shaft is offset from the shaft axis by a dimension of 0.025 inch to drive the block 18 through a circular orbit. The eccentric travel at this point acts only horizontally on the swing arm, but with multiplied effect at the bottom end of the swing arm. A factor of about 2 is involved to produce peak to peak travel of 0.100 inch at the gripper face 13G.

When a loop has been completely formed about an object to be tied and the overlapping ends are engaged between the gripper faces 12G and 13G, the motor is energized for about a one-half second time interval and the face 13G executes a longitudinally oscillating mode of movement at an amplitude, peak to peak, of 0.100 inch and a frequency of 5000 cycles per minute. This develops a total sliding friction travel at substantially all strap surface points within the interface region of about 10 inches, a value sufficient to bring the contacting surfaces to melting temperature in the case of polypropylene. The interface surfaces will begin to bond at this time if power to the motor is cut off, solidification actually beginning while the motor shaft damps to a stop. The load pressure on the interface surfaces is maintained for a cooling interval during which substantially complete solidification occurs. After the cooling interval elapses, a cutter element 19 mounted closely alongside the swing arm 13 severs the strap from the supply reel (not shown). Cutting of the strap is accomplished as close to the fused area of the joint as practical in order to avoid elongated exposed tabs extending from the sealed joint. Providing that the swing arm is stationary and centered when the strap is cut facilitates close clearance cutting.

The arrangement shown in FIG. 3, and in fact the same operating conditions can also be used with nylon strap if the joint is subjected to tension while still in a warm or hot state.

Figure 4:
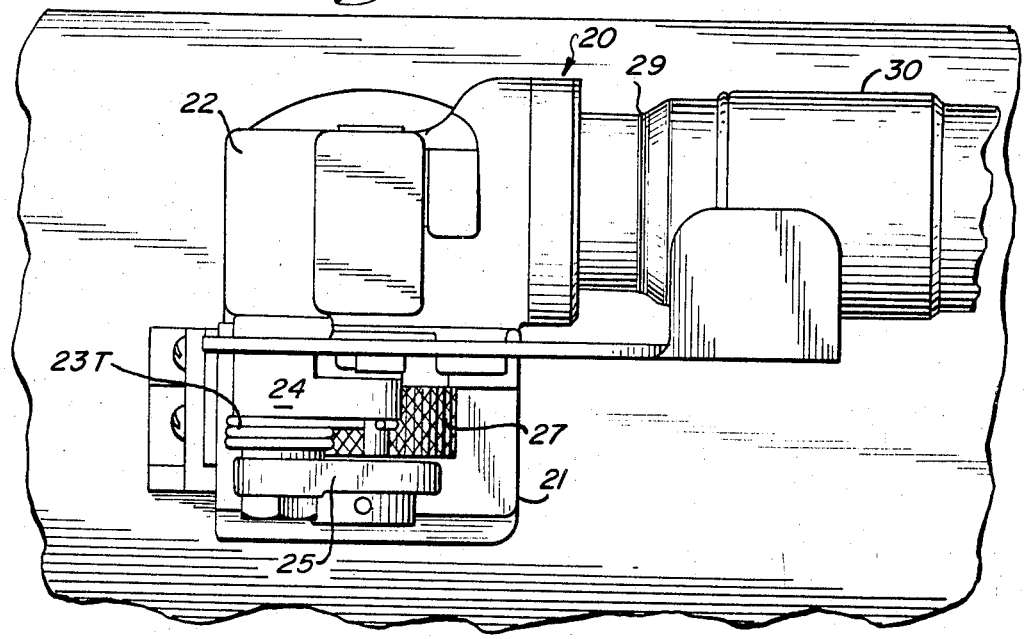
FIG. 4 is a plan view of another form of friction sealer mechanism utilizable in the top tie arrangement shown in FIG. 1 for producing frictional sliding movement.
Figure 5:
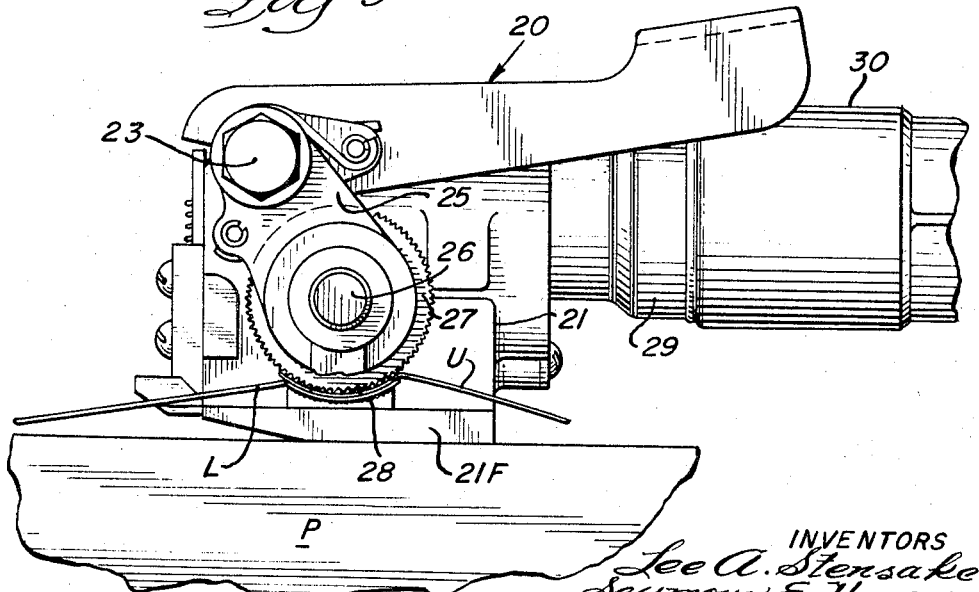
FIG. 5 is an elevational view of the friction sealer mechanism shown in FIG. 4.

A combination tool arrangement is shown in FIGS. 4 and 5 wherein tensioning and friction sealing are carried out in a single device. The combination tool is designated generally at 20 and includes a base 21 presenting a foot 21F for contact with the package to be tied. A gear housing 22 is disposed alongside the base and mounts a pivot shaft 23 which projects through a cradle 24, a torsion spring 23T and an outer link 25. The gear housing 22 also carries one end of a feed wheel shaft 26 which has its opposite end journaled in the outer link 25.

A feed wheel 27 is drivingly mounted on the feed wheel shaft and overlies an upwardly facing concavely curved anvil 28 mounted on the base foot 21F. The strap ends U and L are arranged in overlapping relation between the feed wheel 27 and the anvil 28 and the positioning of these parts is controlled during the operation of the tool for effecting the requisite pressure relationships between the strap ends U and L.

The gear housing 22 receives one end of a housing 29, for an impact clutch unit, the other end of which extends into and mounts an air motor 30. In the use of the tool, the air motor is operated and acts through the impact-clutch unit to drive gearing which connects to the feed wheel shaft 26 until the feed wheel 27 develops a predetermined tension on the strap loop. At this point, the impact clutch repeatedly applies a pulse load to cause the feed wheel 27 to rotate incrementally in a loop tensioning direction. The tensioned loop in turn restores the feed wheel as permitted by the impact clutch unit. Thus, there is generated a high speed oscillating movement between the strap ends U and L while the feed wheel 27 and anvil 28 are maintained appropriately spaced to develop the desired pressure relationships. This simplified tool arrangement is capable of producing effective joints when operated in a controlled range as previously specified herein.

While the control of the total travel is less precise with the manually regulated tool of FIGS. 4 and 5, total travel values are not critical in the case of polypropylene strap so long as the prescribed minimum value is provided. With nylon the rapid removal of the tool, after sealing, by means of its conventional release handle enables loop tension to act on the joint while still warm, in which case total travel control need not be precise.

Another embodiment of friction sealer is illustrated in FIGS. 6, 7 and 7A, and it employs a linear reciprocation directed longitudinally of the strap ends. The disclosure of this form is made in relation to a bottom tie loop configuration wherein the upper strap end U is adjacent the package and is to be stationary. In this embodiment, the upper gripper element 40 is an extension of the main frame and is established in stationary contact with the object or package P. The lower gripper element 41 is mounted in an undercut guideway 42G provided in a guide block 42. The gripper element 41 has edge flanges 41F insertable endwise into the guide block 42 to retain the parts against vertical separation. The guide block 42 is carried on a pressure plate 43 mounted on a lift rod 44 which is elevated by any suitable device capable of establishing and maintaining uniform pressure between the gripper elements. A reciprocating drive arm 45 is shown pivotally connected to the lower gripper element 41 and is driven in any suitable fashion where turn on and turn off can be conveniently timed.

A channeled jaw configuration is illustrated wherein each of the gripper elements 40 and 41 presents a gripper face characterized by registered lengthwise tooth strips 40T and 41T spaced apart by lengthwise channels 40C and 41C (see FIG. 7A). The resultant joint is characterized by a channel pattern comprised of side by side located lengthwise extending fused regions separated by intermediate lengthwise regions which are not connected.

The embodiment shown in FIGS. 8, 9 and 10 is illustrated as a top tie arrangement and produces a different mode of sliding frictional movement. It includes a lower gripper element 50 as an extension of the main frame for stationary contact with the package P. An upper gripper element 51 is disposed in loosely swiveled relation on a set of opposed front and rear guide rails 52 that depend from the frame of a motor 53. The motor 53 has a drive shaft 54 terminating in an eccentric stub end 54E of noncircular cross section which drivingly seats in a top socket provided in the upper gripper element 51. The motor 53 is secured to a lifter rod 55 which determines the pressure acting between the gripper faces. The drive shaft 54 presents a shoulder 54S abutting the top face of the upper gripper element 51 to handle the thrust associated with the pressure engagement of the gripper faces. The upper gripper element 51 has side grooves 51G which receive flanges on the guide rails 52 and clearance is provided to accommodate a rotary movement path for the upper gripper element. Thus, the mode of movement achieves substantially equal total travel at all regions of the interfaces and an effective fusion joint is achieved at the operating ranges previously specified.

Finally, an embodiment is shown in FIG. 11 wherein oppositely acting solenoids 60 and 61 are associated with a swing arm 62 mounted to pivot about a shaft 63. Pressure is applied to the upper gripper element 64 which is otherwise held stationary and the lower gripper element 65 is slidable along a rail 66 and has a transverse drive rod 65R engaged in a fork 62F at the upper end of the swing arm. Arcuate travel of the swing arm produces linear horizontal reciprocating travel of the lower gripper element in the longitudinal direction of the strap.

Rubber cushions 67 and 68 are shown on stationary blocks 69 and 70 at opposite sides of the swing arm 62 and solenoids 60 and 61 are provided to be operated in alternating sequence and drive the swing arm through an oscillation at a rate of 5000 cycles per minute and at an amplitude peak to peak of 0.200 inch.

One advantage of the solenoid arrangement of FIG. 11 resides in the fact that the direction of initial movement of the swing arm 62 is readily controllable by the energizing circuitry (not shown) for the solenoids 60 and 61. In particular, the solenoid which causes the gripper element to move towards the tension mechanism 20 which is associated with the friction sealer and which is within the loop enables slack to be drawn from the supply end of the strap. This relationship is of added importance where the swing arm is started from a maximum position rather than from the dead center position illustrated in FIG. 11. A start from a maximum position is also easily obtainable by appropriate control of the circuitry. In addition, a dead stop action can also be accommodated by control of the solenoid circuitry. A dead stop technique eleminates the final damping action of the previous oscillation systems and in the case of some materials and fusion conditions can improve the initial solidification process and ultimate joint strength.

It is intended that all matter contained in the accompanying specification shall be interpreted as being illustrative and not in a limiting sense.

What is claimed is:

1. Apparatus for surface fusing lengthwise overlapping section of thin thermoplastic strap formed into a tensioned loop, said apparatus comprising means mounting a pair of gripper elements having corresponding strap gripping surfaces disposed in confronting relationship to receive said overlapping sections therebetween, pressure applying means connected to force said gripper elements into strap compressing relation against said strap sections to establish a greater static coefficient of friction between each gripper element and corresponding strap section than between the straps, drive means connected to at least one of said gripper elements to move the same multidirectionally relative to the other gripper element in a plane parallel to the plane of contact of the interface regions, and means operable before release of the pressure means and connected for cyclically actuating the drive means for at least a substantially fraction of a second while the pressure means holds the gripper elements against the strap sections.

2. Apparatus for surface fusing lengthwise overlapping end sections of a loop of thin thermoplastic strap, said apparatus comprising means for tensioning and holding tension on said loop, means mounting a pair of gripper elements having corresponding strap gripping surfaces disposed in confronting relationship to receive said overlapping sections therebetween, pressure applying means connected to force said gripper elements into strap compressing relation against said strap sections to establish a greater static coefficient of friction between each gripper element and corresponding strap section than between the strap sections, drive means connected to at least one of said gripper elements to move the same multidirectionally relative to the other gripper element in a plane parallel to the plane of contact of the interface regions and in a cyclical mode of movement to impart substantially equal total frictional travel to all points of the interface regions, and means operable before the release of the pressure means and connected for actuating the drive means at a rate of several thousand cycles per minute for a substantial fraction of a second to develop a total travel of several inches while the pressure means holds the gripper elements against the strap sections.

3. Apparatus for surface fusing lengthwise overlapping end sections of a loop of thin thermoplastic strap, said apparatus comprising first support means mounting a stationary first gripper element to present a broad faced gripper surface oriented in a predetermined plane, second support means movably mounting a second gripper element to present a broad faced gripper surface located in confronting relation to the first named gripper surface and oriented for movement in a parallel plane, shiftable means connected to said second support means to shift the same in a direction to bring said gripper surfaces into strap compressing relation against said overlapping strap sections after tensioning of said loop to establish a greater frictional engagement between each gripper element and corresponding strap section than between the strap sections, and drive means connected to said second gripper element and operable when the gripping surfaces are holding the overlapping sections compressed to drive the second gripper element in a multidirectional low amplitude mode of movement in a plane parallel to said predetermined plane.

4. Apparatus for surface fusing lengthwise overlapping end sections of a tensioned loop of thin thermoplastic strap, said apparatus comprising first support means mounting a stationary first gripper element to present a broad faced gripper surface oriented in a predetermined plane, second support means movably mounting a second gripper element to present a broad faced gripper surface located in confronting relation to the first named gripper surface for movement in a parallel plane, shiftable means connected to said second support means to shift the same in a direction to bring said gripper surfaces into strap compressing relation against said overlapping strap sections after tensioning of said loop to establish a greater frictional engagement between each gripper element and corresponding strap section than between the strap sections, and drive means connected to said second gripper element and cyclically operable when the gripping surfaces are holding the overlapping sections compressed to drive the second gripper element at a rate of several thousand cycles per minute in a multidirectional low amplitude mode of movement parallel to said predetermined plane to maintain substantial registry of said sections and to minimize changes in loop tension.

5. The method of surface fusing lengthwise overlapping major surface portions of strap formed into a tensioned loop comprising the steps of forcing corresponding interface regions of said major surface portions into contact under substantial pressure, concurrently generating heat at said interface regions by causing multidirectional relative sliding frictional movement therebetween at a rate to develop a rise to surface melting temperature, holding said interface regions in fusing contact under substantial pressure after terminating such movement and until substantial solidification of said regions creates a load transmitting joint therebetween, and applying a tension load to the joint while the adjacent strap material is warm.

6. The method of surface fusing lengthwise overlapping major surface portions of strap formed into a tensioned loop comprising the steps of forcing corresponding interface regions of said major surface portions into contact under substantial pressure, concurrently generating heat at said interface regions by causing multidirectional relative sliding frictional movement therebetween substantially equalized in total travel at all points throughout said regions and at a cycle rate to develop a rise to surface melting temperature, holding said interface regions in fusing contact under substantial pressure after terminating such movement and until substantial solidification of said regions creates a load transmitting joint herebetween, and applying a tension load to the joint while the adjacent strap material is warm.

7. The method of surface fusing lengthwise overlapping end sections of a tensioned loop of thin thermoplastic strap, said overlapping end sections presenting major surface portions for face to face contact, said method comprising the steps of forcing corresponding planar interface regions of said major surface portions into contact under substantial pressure, concurrently generating heat at said interface regions by causing multidirectional relative sliding frictional movement therebetween at a rate to develop a rise to surface melting temperature, holding said interface regions in fusing contact under substantial pressure after terminating such movement and until substantial solidification of said regions creates a load transmitting joint therebetween, and releasing the end sections to enable the tension in the loop to act on the joint while the adjacent strap material is still warm.

8. The method of forming a closed loop of thin thermoplastic strap, comprising forming and pulling tension on a loop of strap to bring end sections of the loop into lengthwise overlapping relationship wherein the end sections present major surface portions for face to face contact, forcing corresponding planar interface regions of said major surface portions into contact under substantial pressure, concurrently generating heat at said interface regions by causing multidirectional relative sliding frictional movement therebetween substantially equalized in total travel at all points throughout said regions and at a cycle rate to develop a rise to surface melting temperature, holding said interface regions in fusing contact under substantial pressure after terminating such movement and until substantial solidification of aid regions creates a load transmitting joint therebetween, and releasing the end sections of holding pressure to enable the tension in the loop to act on the joint while the adjacent strap material is still warm.

9. Apparatus for surface fusing lengthwise overlapping end sections of a loop of thin thermoplastic strap, said apparatus comprising means for tensioning and holding tension on said loop, means mounting a pair of gripper elements having corresponding strap gripping surfaces disposed in confronting relationship to receive said overlapping sections therebetween, pressure applying means connected to force said gripper elements into strap compressing relation against said strap sections to establish a greater static coefficient of friction between each gripper element and corresponding strap section than between the strap sections, drive means connected to at least one of said gripper elements to move the same multidirectionally relative to the other gripper element in a plane parallel to the plane of contact of the interface regions and in a cyclical mode of movement to impart substantially equal total frictional travel to all points of the interface regions, means operable while the pressure means is active for actuating the drive means at a rate of several thousand cycles per minute for a substantial fraction of a second to develop a total travel of several inches and develop a rise to melting temperature at the interface regions, and means to release pressure after operation of the drive means has terminated long enough to enable substantial solidification of the interface regions to create a load transmitting joint, said release means being operable while the joint is still warm to enable tension of the loop to act directly on the warm joint.

10. Strapping apparatus for securing a ligature about an article, which ligature is made of a length of thermoplastic strap formed into a loop having overlapping end portions comprising means for withdrawing one of the end portions to constrict the loop about the article and to place the loop in tension, means for forcing opposing surface regions of said overlapping strap portions into frictional engagement, means for fusing said opposing surface regions by multidirectionally bodily sliding said opposing surface regions to form a joint by initially effecting interface melting of the opposing surface regions and by subsequently effecting solidification of said opposing surface regions.

11. Strapping apparatus as set forth in claim 10 wherein said forcing means includes a pair of gripper elements, means mounting at least one of said gripper elements for movement into strap gripping relationship with the other gripping element.

12. Strapping apparatus as set forth in claim 11 including drive means connected to said movable mounted gripper element to move the same multidirectionally relative to the other gripper element.

13. Strapping apparatus as set forth in claim 12 including means for actuating said drive means for cyclical operation of said movable gripper element.

14. Strapping apparatus as set forth in claim 10 wherein said forcing means includes a pair of spaced gripper elements, means mounting at least one gripper element for movement relative to the other gripper element to place each gripper element in engagement with one of the overlapping end portions, the static coefficient of friction between each gripping element and its respective overlapping end portion being greater than the static coefficient of friction between the interface regions of said overlapping end portions.

15. Strapping apparatus as set forth in claim 10 wherein said forcing means includes opposed gripper elements, each gripper element having a gripping surface oriented in a predetermined plane, whereby the interface regions of said overlapping strap portions are moved in said predetermined plane.

16. Strapping apparatus as set forth in claim 15 wherein said fusing means includes drive means operatively connected to at least one of said gripper elements for moving the same in a direction parallel to said predetermined plane.

17. Strapping apparatus for securing a ligature about an article, which ligature is made of a length of thermoplastic strap formed into a loop having overlapping end portions comprising means for withdrawing one of the end portions to constrict the loop about the article and to place the length of strap in tension, means for forcing opposing surface regions of said overlapping end portion into frictional engagement, means for fusing said opposing surface regions by multidirectional bodily sliding said opposing surface regions while maintaining tension on the length of strap to form a joint by initially effecting interface melting of the opposing surface regions and by subsequently effecting solidification of said opposing surface regions.

18. The method of providing and securing a ligature about an article comprising, providing a length of thermoplastic strap and forming the strap into a tensioned loop encircling the article so that the strap has overlapping surface portions, forcing interface regions of said surface portions into contact under sufficient pressure to establish frictional engagement therebetween, causing relative bodily sliding frictional multidirectional movement between said interface regions until interface melting occurs while maintaining said tensioned loop about the article and while retaining said interface regions in frictional engagement, and terminating such sliding frictional movement, whereby said melted interface regions fuse to achieve solidification of the melted interface regions of the overlapping strap portions.

19. The method of claim 18 including controlling the bodily sliding frictional movement to develop an abrupt surface temperature rise to a point where the dynamic coefficient of friction between said interface regions declines.

20. The method of claim 19 wherein said movement causing step is performed by imparting cyclical multidirectional movement to said interface regions at a rate of several thousand cycles per minute.

21. The method of claim 18 wherein the thermoplastic strap is linearly oriented in the direction of the length of said strap, and wherein said bodily sliding frictional movement is in the direction of orientation of said strap.

22. The method of claim 18 wherein said interface regions are generally planar, with said bodily sliding frictional movement being effected by moving said interface regions in the plane of contact therebetween.

23. The method of claim 18 wherein substantially all points within said interface regions are moved through a composite total relative travel of several inches.

24. The method of claim 18 wherein said bodily sliding frictional movement continues for at least a substantial fraction of a second.

25. The method of claim 18 wherein said interface regions are forced into contact by movement of at least one forcing member, the pressure of said forcing member establishing a greater coefficient of friction between the biasing member and one strap surface portion then between the strap interface regions.

26. The method of claim 25 wherein said overlapping strap portions are positioned between spaced forcing elements, only one of said biasing elements being movable toward said overlapping strap surface portions.

27. The method of claim 26 wherein said bodily sliding frictional movement is effected by moving said one forcing element multidirectionally.

28. The method of providing and securing a ligature about an article comprising, providing a length of thermoplastic strap and forming the strap into a tensioned loop encircling the article so that the loop has overlapping surface portions, allowing at least a portion of the loop tension to act on said overlapping surface portions forcing interface regions of said surface portions into contact under sufficient pressure to establish frictional engagement therebetween, causing relative multidirectional bodily sliding frictional movement between said interface regions until interface melting occurs while maintaining said tensioned loop about the article and while retaining said interface regions in frictional engagement, maintaining loop tension on the overlapping surface portions during said movement, and terminating such sliding frictional movement, whereby said melted interface regions fuse to achieve solidification of the melted interface regions of the overlapping strap portions.

References Cited

UNITED STATES PATENTS

| | | | |
|---|---|---|---|
| 2,982,069 | 5/1961 | England | 53—198 |
| 3,002,871 | 10/1961 | Tramm et al. | 156—73 |
| 3,118,365 | 1/1964 | Rollo et al. | 53—33 |
| 3,309,839 | 3/1967 | Lyon | 53—198 |

FOREIGN PATENTS 149,296  10/1960  U.S.S.R.

OTHER REFERENCES

Freyes, Robert N.: Fabricating With Friction Heat. In Modern Plastics, November 1945, pp. 142–15.

EARL M. BERGERT, *Primary Examiner.*

D. J. FRITSCH, *Assistant Examiner.*

U.S. Cl. X.R.

53—3, 39, 198; 100—2, 29, 33; 156—580; 217—66